United States Patent
Osuki (10) Patent No.: US 9,158,484 B2
(45) Date of Patent: Oct. 13, 2015

(54) IMAGE PROCESSING APPARATUS, METHOD FOR CONTROLLING THE IMAGE PROCESSING APPARATUS, AND STORAGE MEDIUM

(71) Applicant: CANON KABUSHIKI KAISHA, Tokyo (JP)

(72) Inventor: Takashi Osuki, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/044,125

(22) Filed: Oct. 2, 2013

(65) Prior Publication Data

US 2014/0098396 A1    Apr. 10, 2014

(30) Foreign Application Priority Data

Oct. 4, 2012    (JP) .................................. 2012-221853

(51) Int. Cl.
G06F 3/12         (2006.01)
G06K 15/02        (2006.01)

(52) U.S. Cl.
CPC ............ *G06F 3/1211* (2013.01); *G06K 15/027* (2013.01)

(58) Field of Classification Search
None
See application file for complete search history.

(56) References Cited

U.S. PATENT DOCUMENTS

| 8,184,308 B2 * | 5/2012 | Miyata | 358/1.14 |
| 2006/0018655 A1 * | 1/2006 | Yoshida | 396/611 |
| 2007/0070460 A1 * | 3/2007 | Yamada | 358/504 |
| 2007/0165255 A1 * | 7/2007 | Takeuchi | 358/1.9 |

FOREIGN PATENT DOCUMENTS

| JP | 10117264 | * | 5/1998 |
| JP | 2004-90457 A | | 3/2004 |

* cited by examiner

*Primary Examiner* — Fan Zhang
(74) *Attorney, Agent, or Firm* — Canon USA, Inc., IP Division

(57) ABSTRACT

An image processing apparatus capable of performing calibration includes a storage unit configured to store a calibration job for performing calibration and a normal job for performing image processing in order of reception, a judgment unit configured to judge whether to interrupt the normal job during execution of the normal job and to perform the calibration job, and a control unit configured to interrupt processing of the normal job to be in a state where the processing can be resumed and perform the calibration job if it is judged that the calibration job is to be performed, and to perform the calibration job after the stored normal job is completed if it is judged that the calibration job is not to be performed.

9 Claims, 7 Drawing Sheets

IMAGE PROCESSING APPARATUS, METHOD FOR CONTROLLING THE IMAGE PROCESSING APPARATUS, AND STORAGE MEDIUM

BACKGROUND OF THE INVENTION

1. Field of the Invention

The present invention relates to an image processing apparatus for performing calibration, a method for controlling the image processing apparatus, and a storage medium.

2. Description of the Related Art

In image processing apparatuses such as printers and copying machines, printing characteristics of a printer engine may change due to change in environmental conditions (for example, temperature and humidity), change in temperature of a fixing device included in the printer engine, change in charging conditions of a charging device, effects due to displacement and deformation of various components included in the printer engine, and the like. If printing is performed in a state where the printing characteristics have changed, the printing may result in outcomes different from those expected by a user, for example, different reproducibility in gradation and tint in a printed image as compared to its original image. To solve the problem, in many apparatuses, color misregistration correction processing and color tone adjustment processing is performed for every predetermined number of printed sheets, or at the time of startup. Hereinafter, the color misregistration correction processing and the color tone adjustment processing are collectively called "calibration processing".

The calibration processing takes some time and consequently, if a user issues a print instruction during the execution, the time from the user's print instruction to the actual execution of the printing becomes longer than usual. To solve the problem, a method for determining whether to execute calibration processing based on a sensor value or the time passed since the last calibration processing to restrain the execution of the calibration processing is proposed (Japanese Patent Application Laid-Open No. 2004-90457).

In the known method, by reducing the frequency of the execution of the calibration processing, the frequency of occurrence of printing standby states of the user can be reduced. Once the calibration processing is executed, however, the user cannot perform printing until the calibration processing is completed.

SUMMARY OF THE INVENTION

The present invention is directed to providing a mechanism enabling users to change execution timing of automatic calibration processing by a remarkably-simple operation.

According to an aspect of the present invention, an image processing apparatus capable of performing calibration includes a storage unit configured to store a calibration job for performing calibration and a normal job for performing image processing in order of reception, a judgment unit configured to judge whether to interrupt the normal job during execution of the normal job and to perform the calibration job, and a control unit configured to interrupt processing of the normal job to be in a state where the processing can be resumed and perform the calibration job if it is judged that the calibration job is to be performed, and to perform the calibration job after the stored normal job is completed if it is judged that the calibration job is not to be performed.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

Figure 1:
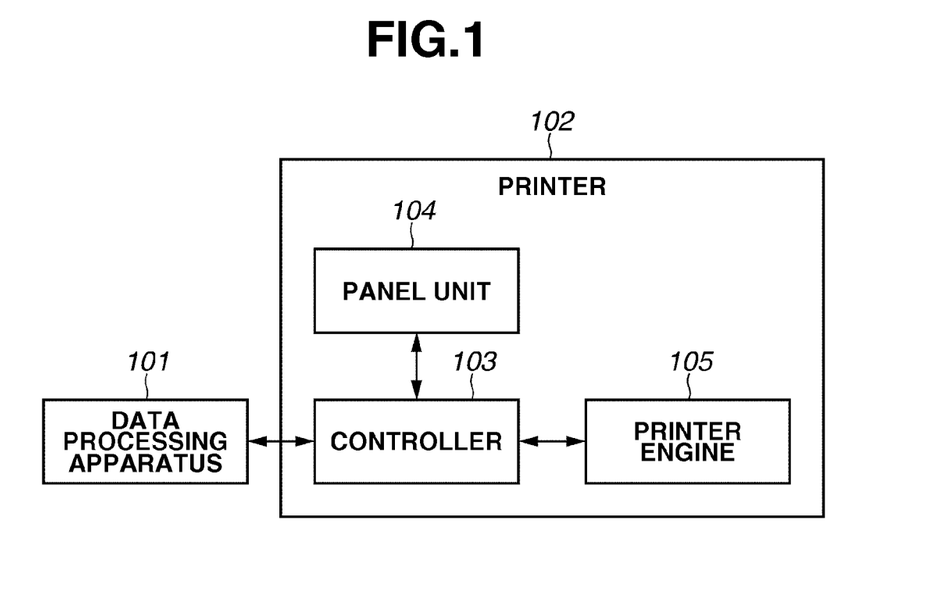
FIG. 1 is a block diagram illustrating a configuration of a printing system including an image processing apparatus.

FIG. 1 is a block diagram illustrating a configuration of a printing system including an image processing apparatus according to a first exemplary embodiment of the present invention. In the description below, jobs include jobs (normal jobs) as requests to the image processing apparatus, and jobs (calibration jobs) for calibration.

The printing system according to the exemplary embodiment includes a data processing apparatus 101 and a printer 102 that serves as an image processing apparatus. The data processing apparatus 101 serving as a host apparatus is, for example, a personal computer, and the apparatus 101 serves as a supply source of image information to be used in the image processing apparatus, or as a control apparatus of the image processing apparatus. The printer 102 is an electrophotographic-type laser-beam printer.

The image processing apparatus according to the exemplary embodiment of the present invention is not limited to the above-described printer, and alternatively, as long as the calibration can be performed, a copying machine, a fax machine, or a multifunctional peripheral having these functions can be employed as the imaging processing apparatus. A printing method can be an inkjet method, or the other printing methods.

In a case of a copying machine, the data processing apparatus can function as a reader unit for performing reading of a document and outputting the read data to a controller of the copying machine. In a case of a facsimile machine, the data processing apparatus can function as an apparatus for receiving data and outputting the received data to a controller of the facsimile machine or a unit corresponding to the controller.

Further, in the exemplary embodiment of the present invention, in the printer or the like, print data is externally input, or a memory device such as a memory card can be attached to the printer itself to input print data, and printing can be performed using the data.

In the printer 102 illustrated in FIG. 1, based on image information (for example, an escape (ESC) code, a page description language, and the like) supplied from the data processing apparatus 101, a controller 103 generates raster data for each page, and outputs the data to a printer engine 105.

In the calibration, the controller 103 transfers patch data to the printer engine 105. Based on density measurement data of the patches and color misregistration measurement data transferred from the printer engine 105, the controller 103 performs processing for updating contents of a γ correction table, starting positions in the image writing, distortion correction amounts, and the like.

Based on the raster data supplied from the controller 103, the printer engine 105 forms a latent image on a photosensitive drum with a laser beam, and develops the latent image with toners of cyan (C), magenta (M), yellow (Y), and black (K). The controller 103 further transfers and fixes the toner image onto a print medium, and thus the printing of image and the like is performed.

In the calibration processing described below, the printer engine 105 forms a predetermined patch as a toner image onto the photosensitive drum based on the patch data transferred from the controller 103. The printer engine 105 further performs an operation for measuring a density, a position, a shape of the patch with an optical sensor provided around the photosensitive drum.

A panel unit 104 is used as a user interface. A user can operate keys on the panel unit 104 to issue an instruction of a desired operation. On the panel unit 104, a processing content of the printer 102 or a warning content for the user can be displayed.

Figure 2:
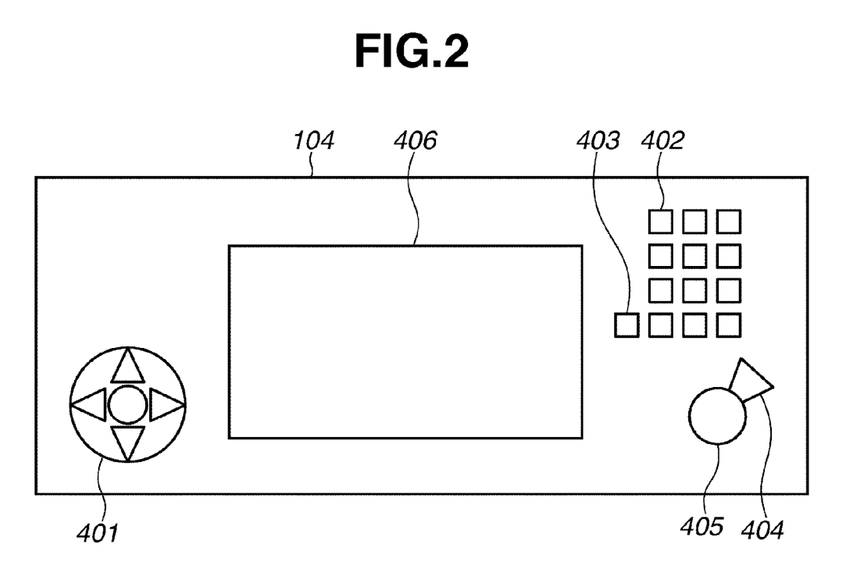
FIG. 2 is a plan view illustrating a structure of a panel unit illustrated in FIG. 1.

With reference to FIG. 2, a structure of the panel unit 104 is described.

FIG. 2 is a plan view illustrating a structure of the panel unit 104 illustrated in FIG. 1.

In FIG. 2, a liquid crystal display (LCD) 406 displays various kinds of UI screens and receives a touch input to the corresponding UI screen from a user. The LCD 406 performs display of the various kinds of screens based on instructions from the controller 103.

A selection key 401 includes up, down, right, and left keys, and an enter key. The user uses the up, down, right, and left keys to move a cursor in a menu screen displayed on the LCD 406, and presses the enter key to determine an item selected by the cursor.

A numeric keypads 402 are used to receive a numeric value input such as the number of print copies from the user. A reset key 403 is used to clear a setting value during a setting operation to return the settings to initial values.

A stop key 404 is used to receive an instruction (stop instruction) to cancel (stop) a job being requested to be executed from the user. A start key 405 is used to be pressed to start the image processing of the set content. The components 401 to 405 according to the exemplary embodiment are hard keys.

Figure 3:
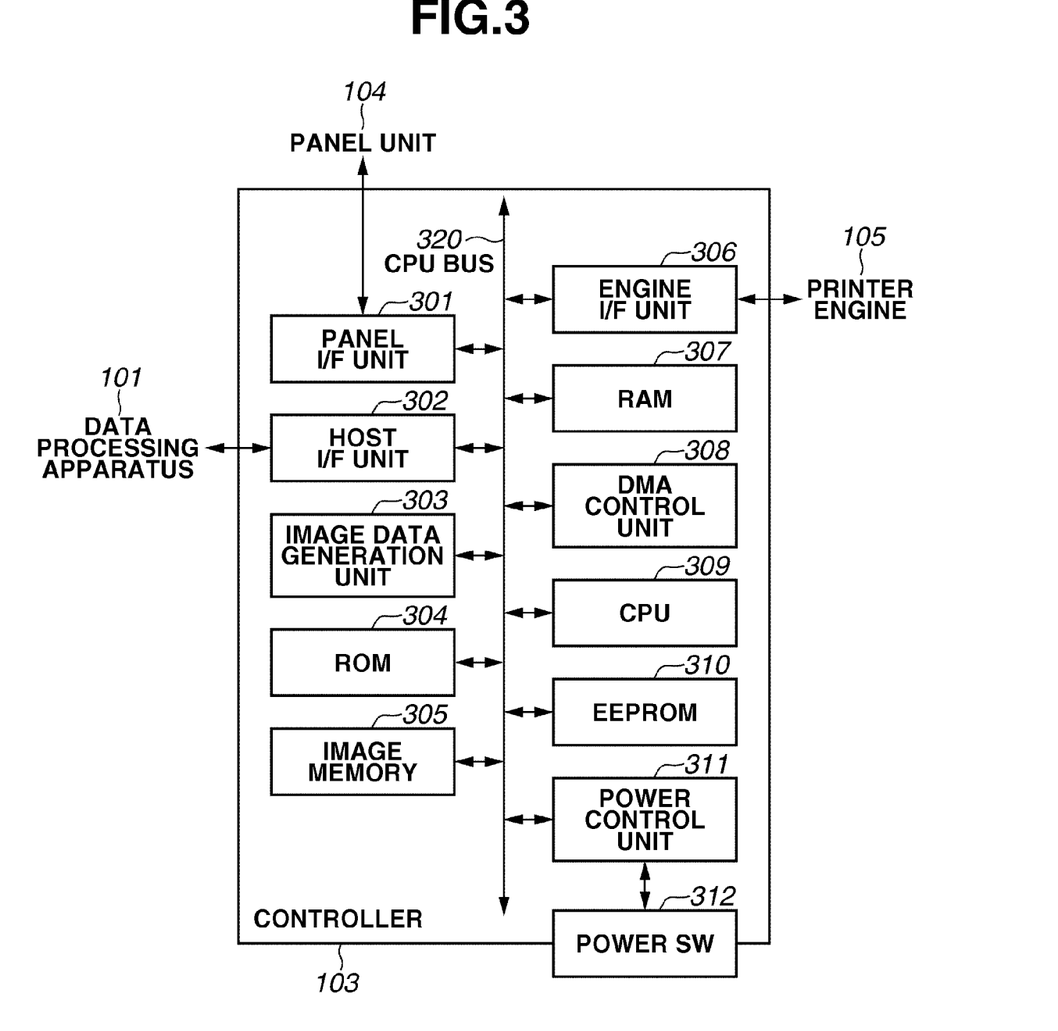
FIG. 3 is a block diagram illustrating a detailed configuration of a controller illustrated in FIG. 1.

FIG. 3 is a block diagram illustrating a detailed configuration of the controller 103 illustrated in FIG. 1.

In FIG. 3, a panel interface unit (panel I/F unit) 301 performs data communication with the panel unit 104. Via the panel interface unit 301, a central processing unit (CPU) 309 can check a content that has been set and instructed via the panel unit 104 by the user.

Via a network, a host interface unit (host I/F unit) 302 bi-directionally communicates and connects with the data processing apparatus 101 such as a host computer.

An engine interface unit (engine I/F unit) 306 communicates and connects with the printer engine 105. Via the interface unit 306, the CPU 309 can check a status of each signal illustrated in FIG. 4, and recognize the status of the printer engine 105.

Based on a control program code stored in a read-only memory (ROM) 304, the CPU 309 performs control of the above-described interface units and each unit, which will be described below, connected to a CPU bus 320. The control processing includes control of the printer engine 105 with respect to the calibration, patch data transfer, and updating processing and control of a γ correction table based on measurement data transferred from the printer engine 105.

In other words, based on the image information supplied from the data processing apparatus 101, an image data generation unit 303 generates raster data (rasterizes) to be supplied to the printer engine 105. An image memory 305 is used to temporarily store the generated raster data.

A random access memory (RAM) 307 is used as a temporary storage memory in the above-described control by the CPU 309, and configured such that the memory capacity can be extended by an optional RAM connected to an expansion port (not illustrated). Further, the RAM 307 can be used as a drawing object storage unit for storing a drawing object, or a work memory to be used in the control program execution of the CPU 309. The RAM 307, when job requests are received, stores the jobs in order of reception of the jobs, and performs control such that the CPU 309 can execute a calibration job received first after the completion of a normal job according to a control procedure described below.

An electrically erasable and programmable read only memory (EEPROM) 310 is a non-volatile memory, and is used, for example, to store image processing information such as the above-described γ correction table.

A direct memory access (DMA) control unit 308 transfers raster data in the image memory 305 to the engine interface unit 306 according to an instruction from the CPU 309. By the operation, the raster data can be transferred to the printer engine 105.

A power control unit 311 changes a power state of each units and a state of a power switch (SW) 312 according to an instruction from the CPU 309. Further, the power control unit 311 detects a change in the power SW 312, and notifies the CPU 309 of the change. The power SW 312 can be turned on or off from the outside by the user. The power SW 312 can also be turned on or off by the power control unit 311.

The CPU bus 320 includes an address bus, a data bus, and a control bus. The CPU bus 320 mutually connects the panel inter face unit 301, the host interface unit 302, the image data generation unit 303, the ROM 304, the image memory 305, the engine interface unit 306, the RAM 307, the DMA control unit 308, the CPU 309, the EEPROM 310, and the power control unit 311. By the CPU bus 320, the connected units can access one another.

Figure 4:
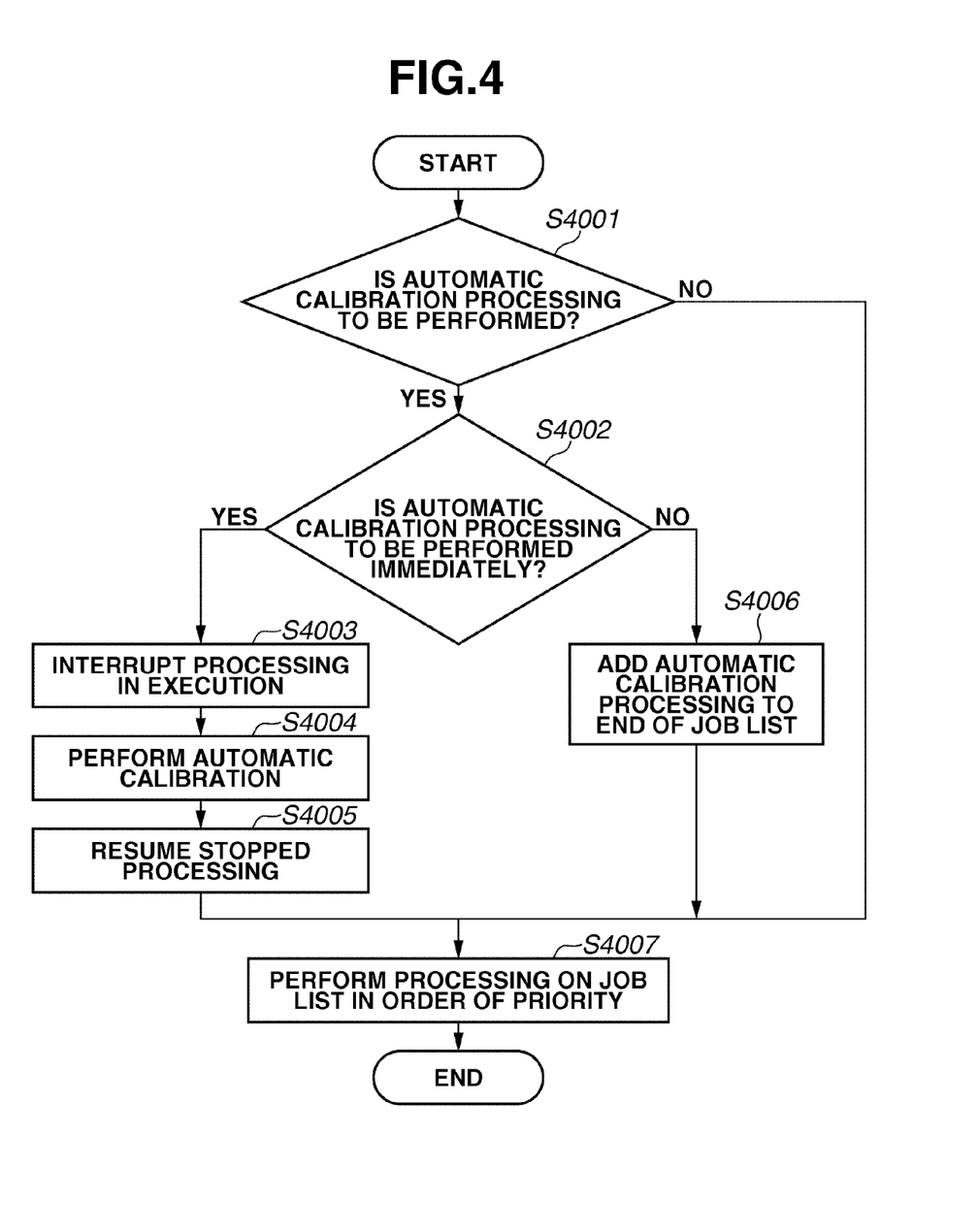
FIG. 4 is a flowchart illustrating a control method for the image processing apparatus.

FIG. 4 is a flowchart illustrating a control method for the image processing apparatus according to the exemplary embodiment. This method is an example of general calibration processing performed in the printer 102 illustrated in FIG. 1. Hereinafter, a list of processes stored in the RAM 307 is referred to as a "job list". The processes on the job list are referred to as "jobs". Each step is implemented by executing a control program stored in the ROM 304 or the like by the CPU 309.

In step S4001, the CPU 309 judges whether automatic calibration processing is to be performed when the image processing apparatus starts, print processing is completed, a status change of the printer engine 105 is detected, or the like. The above-mentioned timing for performing the judgment is an example, and the judgment can be performed at any timing. The criteria for the judgment whether to perform the automatic calibration processing generally include time elapsed since last calibration processing, environmental changes such as changes in temperature, humidity, and charged states in the apparatus, and the number of sides to be printed. In the exemplary embodiment, however, the criteria are not limited to the above-mentioned criteria.

In step S4001, if the CPU 309 judges that automatic calibration processing is to be performed (YES in step S4001), in step S4002, the CPU 309 further judges whether the automatic calibration processing is to be performed immediately. If the CPU 309 judges that the automatic calibration processing is to be performed immediately (YES in step S4002), in step S4003, the CPU 309 interrupts other processing in execution to be in a state where the processing can be resumed. For example, the CPU 309 interrupts the print processing at a timing in which the process can be resumed.

In step S4004, while the process in execution is being interrupted, the CPU 309 performs the automatic calibration processing. In step S4005, the CPU 309 resumes the interrupted processing. In step S4007, the CPU 309 performs the processing on the job list in order of priority, and ends the processing.

As described above, in the exemplary embodiment, if the CPU 309 judges that the calibration job is to be performed (step S4002), the CPU 309 interrupts the processing of the normal job to be in a state where the process can be resumed, and performs the calibration processing.

In step S4002, while the CPU 309 judges that the automatic calibration processing is to be performed immediately, if it is not possible to interrupt the processing in execution, or the processing is not to be interrupted, the CPU 309 may determine to perform the calibration processing after the processing in execution is completed.

On the other hand, in step S4002, if the CPU 309 judges that the automatic calibration processing is not to be performed immediately (NO in step S4002), in step S4006, the CPU 309 adds the automatic calibration processing to the end of the job list. Then, the CPU 309 sequentially performs the processing on the job list in order of priority. When the turn of the automatic calibration processing comes, the CPU 309 performs the automatic calibration processing and ends the processing.

Figures 5, 5A:
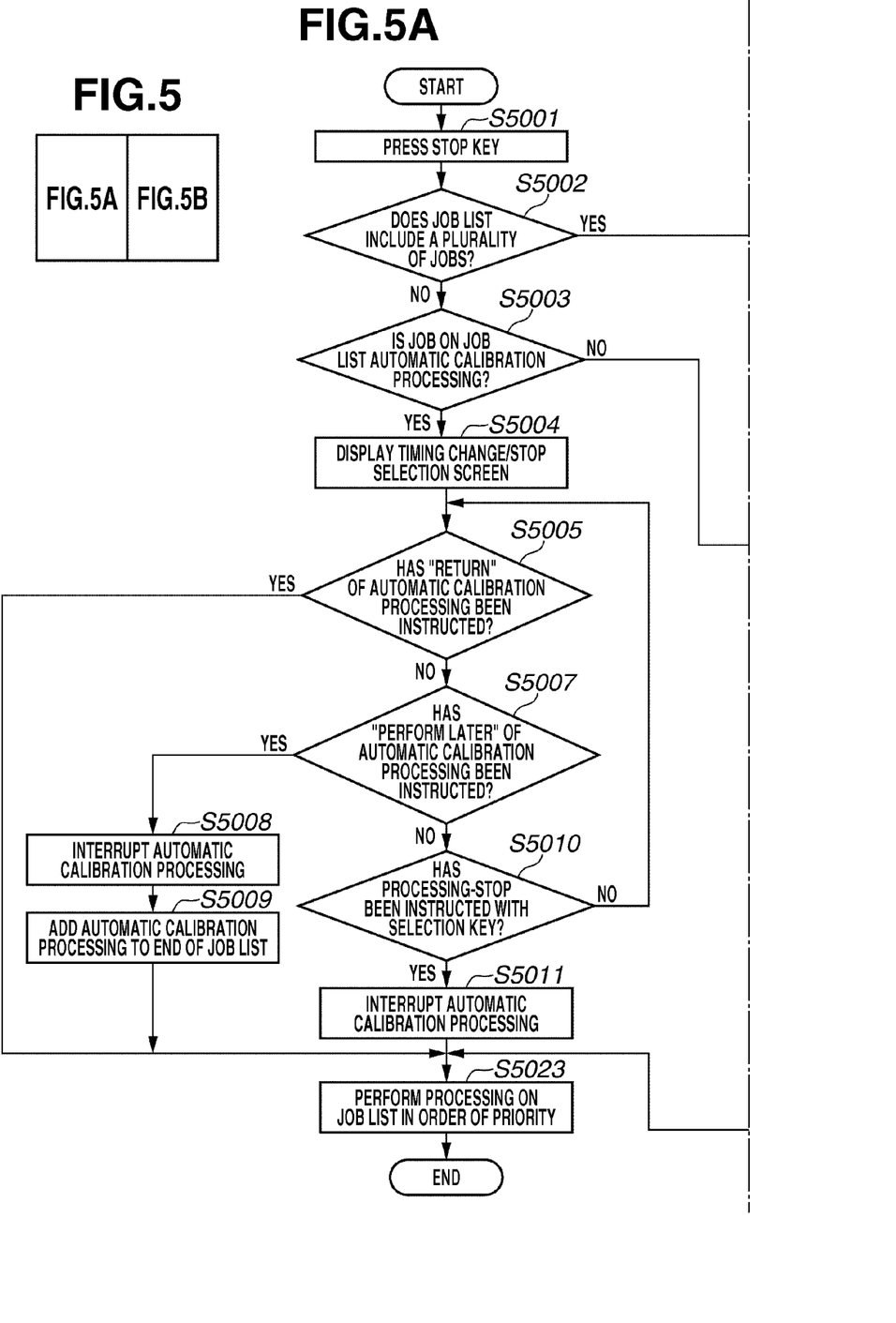
FIG. 5, composed of FIG. 5A and FIG. 5B, is a flowchart illustrating a control method for the image processing apparatus.
Figure 5B:
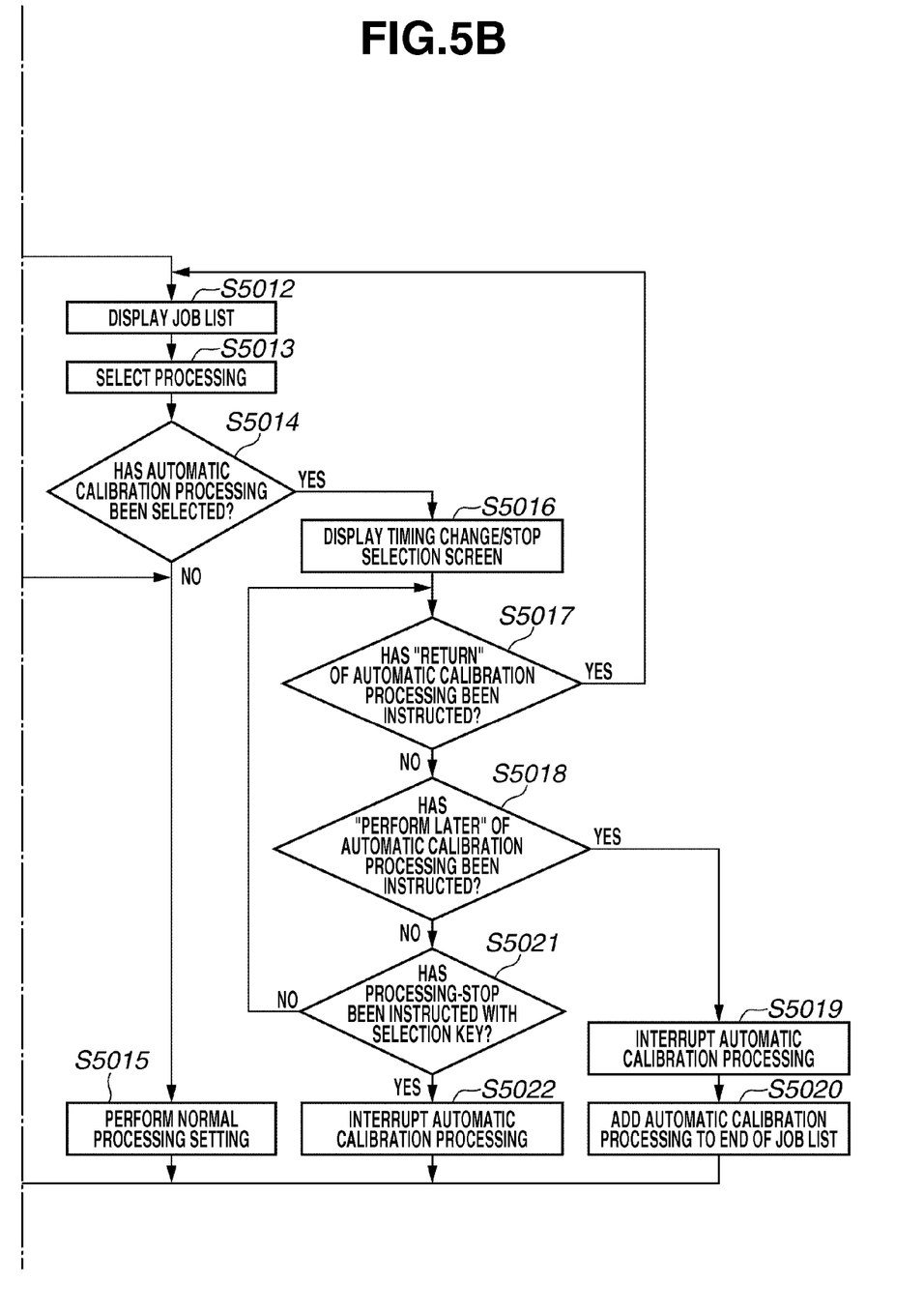

FIG. 5 is a flowchart illustrating a control method for the image processing apparatus according to the exemplary embodiment. This exemplary method is an example of calibration processing timing changing processing to be performed in the printer 102 illustrated in FIG. 1. The automatic calibration described in this calibration processing timing changing flow is provided by the method described with reference to FIG. 4.

Hereinafter, display control for displaying a screen for an inquiry about whether to change the timing for performing the calibration job stored in the RAM 307 if an instruction for interrupting the job processing in execution is issued by the instruction unit (stop key 404) will be described in detail.

A case where the controller 103 is sequentially performing the processing on the job list in step S4007 or in step S5016 is described below. Hereinafter, a processing procedure to be performed by the CPU 309 of the controller 103 when the stop key 404 is pressed will be described.

In step S5001, if the CPU 309 detects that the stop key 404 on the panel unit 104 is pressed by an operation of the user, the process proceeds to step S5002.

In step S5002, the CPU 309 determines whether a plurality of jobs is stored in the RAM 307 based on a job management table (which is stored in the RAM 307). If the CPU 309 determines that a single job is stored (NO in step S5002), the process proceeds to step S5003. If the CPU 309 determines that a plurality of jobs is stored (YES in step S5002), the process proceeds to step S5012.

In step S5003, if the CPU 309 judges that the processing on the job list is automatic calibration processing (YES in step S5003), the process proceeds to step S5004. If the CPU 309 judges that the processing is not the automatic calibration processing (NO in step S5003), the process proceeds to step S5015.

Now, with reference to the screen transition state of the UI screens illustrated in FIG. 6, the timing change/stop selection processing will be described. Hereinafter, a case where the user presses the stop key 404 when a screen 6000 displaying a state in which the job is being performed is displayed will be described.

Figure 6:
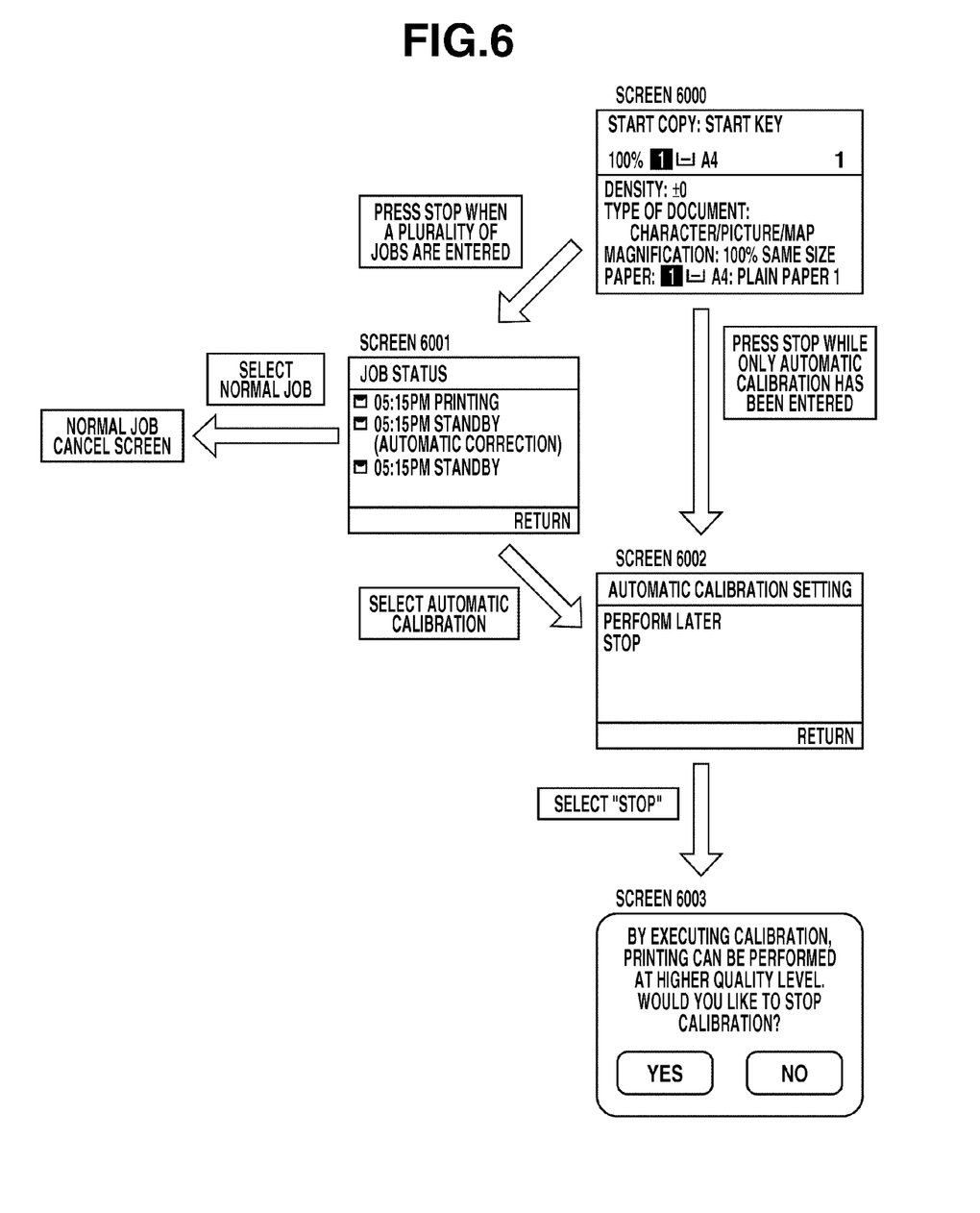
FIG. 6 illustrates an example of UI screens to be displayed on the image processing apparatus.

FIG. 6 illustrates an example of UI screens to be displayed on the image processing apparatus according to the exemplary embodiment. The UI screens are displayed on the LCD 406 on the panel unit 104 according to the control of the CPU 309. Hereinafter, the calibration processing will be described with reference to control to be performed by the CPU 309 to display a screen for receiving an instruction to change a calibration job execution schedule or to stop the calibration job in the case where the CPU 309 determines that a plurality of jobs is not stored (in step S5002).

In step S5004, the CPU 309 displays a timing change/stop selection screen 6002 on the LCD 406, and the process proceeds to step S5005. On the timing change/stop selection screen 6002 in step S5004, the user can select one of "PERFORM LATER", "STOP", and "RETURN". On the selection screen 6002, if the user selects to stop the calibration job from the displayed selection screen, a screen (user confirmation screen 6003) for the CPU 309 to receive an instruction for performing or not performing the calibration job is displayed.

If the user selects "RETURN", the CPU 309 returns the screen to be displayed on the LCD 406 to the state before the stop key 404 is pressed or to the default display state, and performs the processing in step S5023, that is, resumes the normal job processing.

On the other hand, in step S5007, if the CPU 309 detects selection of "PERFORM LATER" of the automatic calibration processing (YES in step S5007), the process proceeds to step S5008. If the CPU 309 does not detect the selection of "PERFORM LATER" of the automatic calibration processing (NO in step S5007), the process proceeds to step S5010.

In step S5008, the CPU 309 interrupts the automatic calibration processing in execution, and the process proceeds to step S5009. In step S5009, the CPU 309 adds the interrupted automatic calibration processing to the end of the job list, and the process proceeds to step S5023.

In step S5009, in addition to the operation to move the automatic calibration processing to the end of the job list, priority change of the processing can be performed.

For example, in a case where "PERFORM LATER" of the automatic calibration processing is selected, the priority of the automatic calibration job can be lowered than that of the other processing. By such arrangements, if the user wants to perform print processing sequentially, as compared to the automatic calibration processing, the print processing of the user can be preferentially performed, and thereby the usability can be increased.

Alternatively, the automatic calibration processing can be added not to the end of the job list, but can be moved next to the first job as a second job in the job list. By such arrangements, the execution of the automatic calibration processing can be delayed by only one job, and this enables the user to perform the printing of the job to be performed immediately, and to perform printing of the other jobs after the execution of the calibration processing.

In step S5023, the CPU 309 performs the processing on the job list in order of priority.

On the other hand, in step S5010, if the CPU 309 detects selection of "STOP" or pressing operation of the stop key 404 (YES in step S5010), the process proceeds to step S5011. In step S5011, the CPU 309 stops the automatic calibration processing, deletes the automatic calibration processing from the job list, and the process proceeds to step S5023.

If the automatic calibration processing is not performed, the print image quality may decrease as compared to the case where the automatic calibration processing is performed. Consequently, before the process proceeds to step S5008 or S5011, it is preferable that the CPU 309 performs processing for displaying the user confirmation screen 6003 illustrated in FIG. 6 on the LCD 406.

In step S5012, the job list screen 6001 is displayed on the LCD 406. In step S5013, the user can select processing on the job list.

In step S5014, if the CPU 309 judges that the process selected by the user in step S5013 is not the automatic calibration processing (NO in step S5014), the process proceeds to step S5015. In step S5015, the CPU 309 performs a normal processing setting, and the process proceeds to step S5023. The normal processing setting is a processing setting to be applied to processing other than the automatic calibration processing, and specifically, the normal processing setting includes a job stop setting and a priority change setting. The processing setting to be applied to processing other than the automatic calibration processing has no close relation to the exemplary embodiment of the present invention, and consequently, the description of such processing setting is omitted in this specification.

As described above, in this exemplary embodiment, if the CPU 309 determines that a plurality of jobs is stored (in step S5002), the CPU 309 performs, depending on a type of the job selected from the displayed jobs, the control to display the selection screen for receiving an instruction to change the execution schedule of the calibration job or to stop the calibration job, or to display the screen for canceling the normal job.

On the other hand, in step S5014, if the CPU 309 judges that the processing selected by the user is the automatic calibration processing, the process proceeds to step S5016.

In step S5016, the CPU 309 displays the timing change/stop selection screen 6002 on the LCD 406, and the process proceeds to step S5017. On the timing change/stop selection screen 6002 in step S5016, the user can select one of "PERFORM LATER", "STOP", and "RETURN".

If the CPU 309 judges that the user has selected "RETURN", the process proceeds to step S5012, and the CPU 309 displays the job list screen 6001 on the LCD 406. If the CPU 309 judges that the user has selected "PERFORM LATER", the process proceeds to step S5019. If the CPU 309 judges that the user has selected "STOP", the process proceeds to step S5022.

Then, in steps S5019, S5020, and S5022, processes similar to the above-described processes in steps S5008, S5009, and S5011 are performed.

In such a configuration, with a remarkably-simple operation, the user can change or stop execution timing of the calibration processing to be automatically performed, and consequently, the convenience of the printing apparatus can be further increased. With reference to the flowcharts, the calibration processing execution flow and the calibration processing timing change flow have been described. The exemplary embodiment of the present invention is only an example, and the present invention is not limited to the exemplary embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-221853 filed Oct. 4, 2012, which is hereby incorporated by reference herein in its entirety.

What is claimed is:

1. An image forming apparatus comprising:
a display;
a storage unit configured to store at least one job;
a reception unit configured to receive a first instruction by a user for cancelling a job;
a determination unit configured to determine whether the storage unit stores a plurality of jobs;
a display control unit configured to display, on the display, a list including at least one job which the storage unit stores and to receive a second instruction by a user for selecting a job in the displayed list, if the reception unit receives the first instruction and the determination unit determines that the storage unit stores a plurality of jobs; and
a job control unit configured to control the selected job,
wherein, if the received second instruction indicates that the selected job is a non-calibration job, the job control unit is configured to control the selected job to be cancelled, and
wherein, if the received second instruction indicates that the selected job is a calibration job, the job control unit is configured to control the selected job to be executed after execution of at least one job included in the displayed list other than the calibration job.

2. The image forming apparatus according to claim 1, wherein the display control unit is configured not to display the list if the reception unit receives the first instruction and the determination unit determines that the storage unit does not store a plurality of jobs.

3. The image forming apparatus according to claim 2, wherein, if the determination unit determines that the storage unit does not store a plurality of jobs, the job control unit is configured to control, based on the reception of the first instruction, a job stored in the storage unit to be cancelled.

4. An image forming method for an image forming apparatus having a display and a storage unit configured to store at least one job, the image forming method comprising:

receiving a first instruction by a user for cancelling a job;

determining whether the storage unit stores a plurality of jobs;

displaying, on the display, a list including at least one job which the storage unit stores and to receive a second instruction by a user for selecting a job in the displayed list, if the first instruction is received and it is determined that the storage unit stores a plurality of jobs; and controlling the selected job, wherein, if the received second instruction indicates that the selected job is a non-calibration job, controlling includes controlling the selected job to be cancelled, and wherein, if the received second instruction indicates that the selected job is a calibration job, controlling includes controlling the selected job to be executed after execution of at least one job included in the displayed list other than the calibration job.

5. The image forming method according to claim 4, wherein displaying includes not displaying the list if the first instruction is received and it is determined that the storage unit does not store a plurality of jobs.

6. The image forming method according to claim 5, wherein, if it is determined that the storage unit does not store a plurality of jobs, the job controlling includes controlling, based on the reception of the first instruction, a job stored in the storage unit to be cancelled.

7. An image forming apparatus comprising:
a storage unit configured to store at least one job;
a reception unit configured to receive a first instruction by a user for cancelling a job;
a determination unit configured to determine whether the storage unit stores a plurality of jobs;
a display control unit configured to display a list including at least one job which the storage unit stores and to receive a second instruction by a user for selecting a job in the displayed list, if the reception unit receives the first instruction and the determination unit determines that the storage unit stores a plurality of jobs; and
a job control unit configured to control a job,
wherein, if a job corresponding to the second instruction is a non-calibration job, the job control unit is configured to control the job corresponding to the second instruction to be cancelled, and
wherein, if a job corresponding to the second instruction is a calibration job, the job control unit is configured to control the job corresponding to the second instruction to be executed after execution of at least one job which the storage unit stores other than the job corresponding to the second instruction.

8. The image forming apparatus according to claim 7, wherein the display control unit is configured not to display the list if the reception unit receives the first instruction and the determination unit determines that the storage unit does not store a plurality of jobs.

9. The image forming apparatus according to claim 8, wherein, if the determination unit determines that the storage unit does not store a plurality of jobs, the job control unit is configured to control, based on the reception of the first instruction, a job stored in the storage unit to be cancelled.

* * * * *